United States Patent [19]

Ohara et al.

[11] Patent Number: 5,768,282

[45] Date of Patent: Jun. 16, 1998

[54] NODE PROVIDED WITH FACILITY FOR CHECKING ESTABLISHMENT OF SYNCHRONIZATION

[75] Inventors: Yasuko Ohara; Hiroshi Yoshida, both of Kawasaki, Japan

[73] Assignee: Fujitsu Limited, Kanagawa, Japan

[21] Appl. No.: 614,946

[22] Filed: Mar. 11, 1996

Related U.S. Application Data

[63] Continuation of Ser. No. 213,254, Mar. 15, 1994, abandoned.

[30] Foreign Application Priority Data

Mar. 15, 1993 [JP] Japan .................. 05-053659

[51] Int. Cl.$^6$ .................................................. H04J 3/06
[52] U.S. Cl. ........................................ 370/506; 370/509
[58] Field of Search ............................ 370/100.1, 105.1, 370/105, 105.3, 105.4, 108, 84, 112, 110.1, 13, 503, 506, 516, 522, 528, 507, 509, 505, 242, 541, 244, 246, 535, 539, 102; 375/362, 365, 366, 372, 373, 354

[56] References Cited

U.S. PATENT DOCUMENTS

| | | | |
|---|---|---|---|
| 4,748,623 | 5/1988 | Fujimoto | 370/105 |
| 4,856,063 | 8/1989 | McCalmont | 380/48 |
| 5,113,395 | 5/1992 | Murakami et al. | 370/102 |
| 5,128,939 | 7/1992 | Takatori et al. | 370/100.1 |
| 5,155,728 | 10/1992 | Takeuchi et al. | 370/100.1 |
| 5,172,376 | 12/1992 | Chopping et al. | 370/100.1 |
| 5,241,543 | 8/1993 | Amada et al. | 370/100.1 |
| 5,265,096 | 11/1993 | Parruck | 370/110.1 |
| 5,325,354 | 6/1994 | Hadano | 370/112 |
| 5,331,630 | 7/1994 | Fujita et al. | 370/84 |
| 5,335,223 | 8/1994 | Iino | 370/108 |
| 5,337,334 | 8/1994 | Molloy | 375/118 |
| 5,343,476 | 8/1994 | Urbansky | 370/108 |

FOREIGN PATENT DOCUMENTS 40 12 762  10/1991  Germany .

*Primary Examiner*—Chau Nguyen
*Attorney, Agent, or Firm*—Helfgott & Karas, P.C.

[57] ABSTRACT

A node in a synchronous communication network performs communication by sending and receiving frames formed by successively adding pointers showing header positions to a plurality of data, wherein a comparison is made between the values of pointers added to data received from an opposing node side and the values of pointers to be added to the data sent from a home node to detect if the two values coincide. Synchronization has been established between the opposing node and the home node when they do.

6 Claims, 13 Drawing Sheets

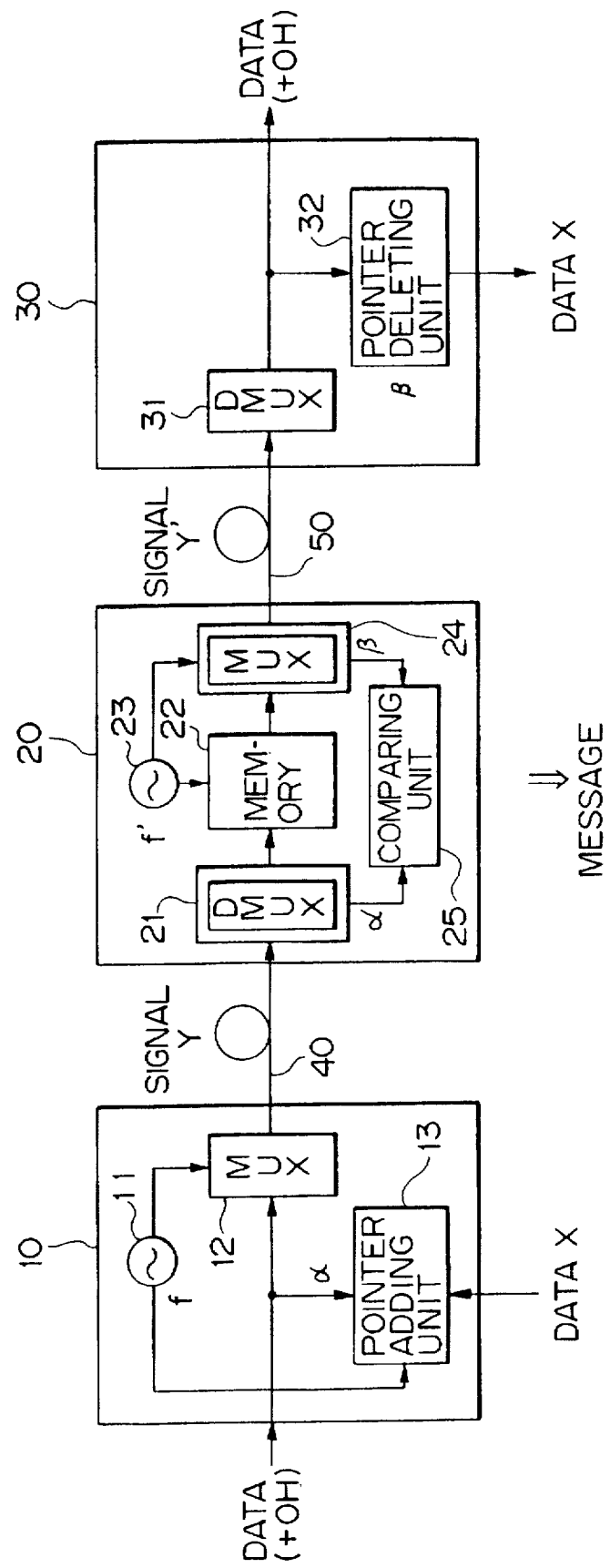

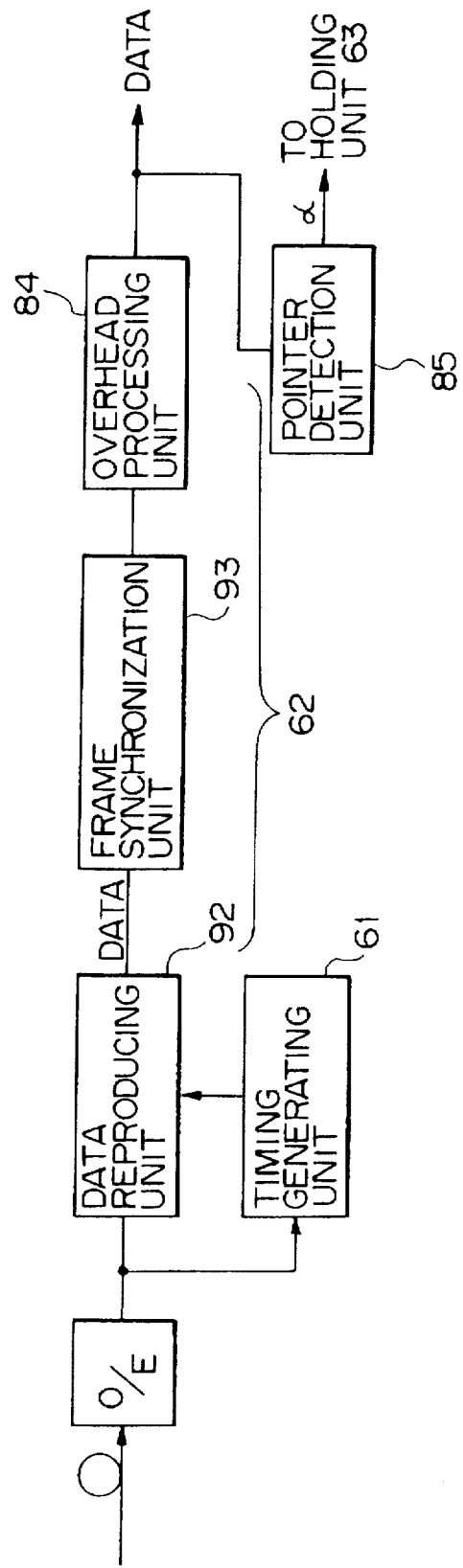

NODE PROVIDED WITH FACILITY FOR CHECKING ESTABLISHMENT OF SYNCHRONIZATION

This is a continuation of application Ser. No. 08/213,254, filed Mar. 15, 1994 abandoned.

BACKGROUND OF THE INVENTION

1. Field of the Invention

The present invention relates to a system for checking for the establishment of synchronization in a synchronous communication network, more particularly relates to a system for checking for the establishment of synchronization which confirms the synchronization from the values of pointers of a received signal and transmission signal.

In recent years, along with the standardization of digital communication networks, synchronous multiplexing has spread even to the higher order region. As a result of this, it has become important to confirm the synchronization between transmission apparatuses in a synchronous communication network, such as SONET in the U.S.

2. Description of the Related Art

In conventional communication systems, a synchronous network is formed only at the lower order side. Since the speed is slow, asynchronization between transmission apparatuses does not pose that much of a problem. Therefore, there is no need to check the state of synchronization and accordingly there has been no continuous confirmation of synchronization performed.

Even in a synchronous communication network covered by the present invention, which will be explained later with reference to the drawings, there has been no general check of the establishment of synchronization including the higher order groups.

As explained above, if synchronous multiplexing is performed up to the higher order region due to the standardization of digital communication networks in recent years, asynchronization among transmission apparatuses sometimes causes trouble. Accordingly, the problem has arisen that it is not possible to check for the establishment of synchronization by a simple method or apparatus.

SUMMARY OF THE INVENTION

Accordingly, the present invention, in view of the above-mentioned problems, has as its object to check the establishment of synchronization by a simple means at each node.

To attain the above object, the present invention takes note of the values of the pointers added to the data of the signal received from the opposing node side and the values of the pointers added to the data when a signal is sent out from the home node as a transmission signal and judges that synchronization between the two nodes has been established when the values of the pointers match.

BRIEF DESCRIPTION OF THE DRAWINGS

The above object and features of the present invention will be more apparent from the following description of the preferred embodiments with reference to the accompanying drawings, wherein:

FIG. 6 is a view of an embodiment of the present invention;

FIG. 13 is a view of an example of a demultiplex function unit shown in FIG. 7 and FIG. 12.

DESCRIPTION OF THE PREFERRED EMBODIMENTS

Before describing the embodiments of the present invention, the related art and the problems therein will be first described with reference to the related figures.

First, an explanation will be made of a known synchronous communication network to which the present invention is applied referring to FIG. 1 to FIG. 4.

Figure 1:
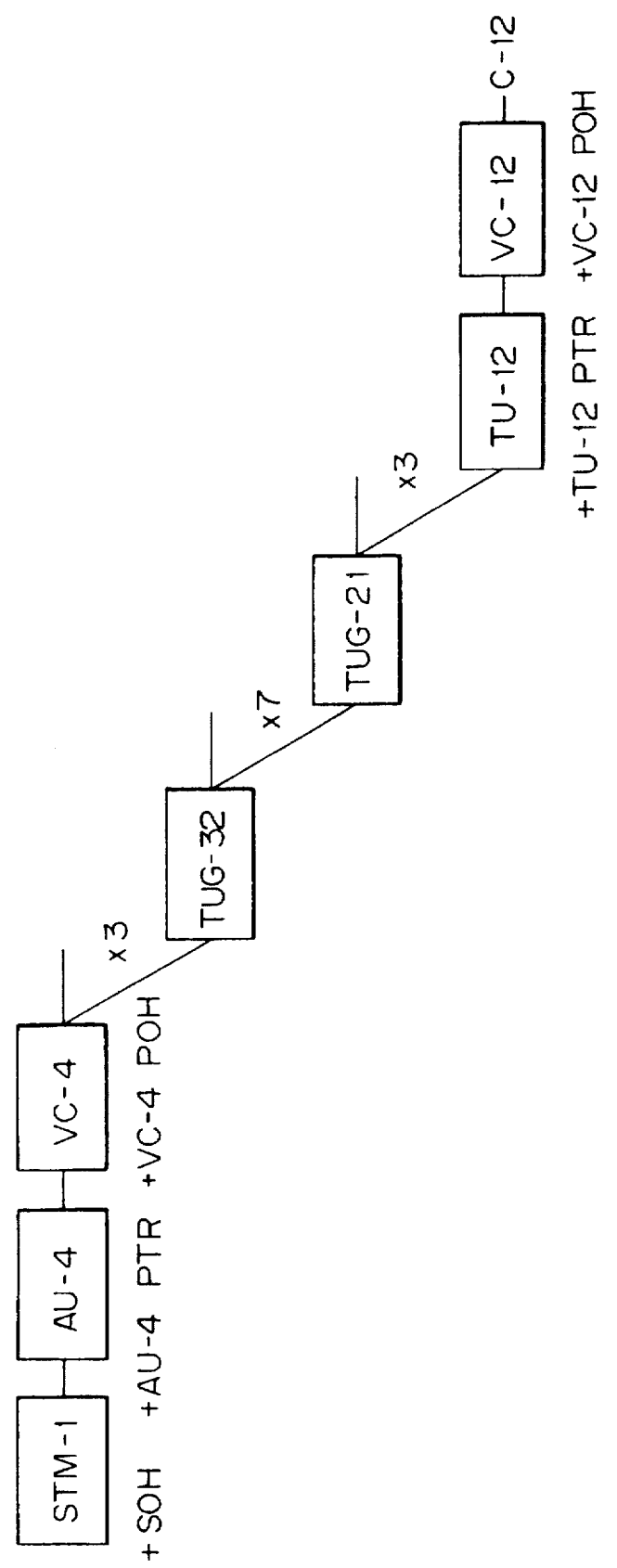
FIG. 1 is a view illustrating a multiplex hierarchy in a synchronous communication network.

FIG. 1 is a view illustrating a multiplex hierarchy in a synchronous communication network.

In FIG. 1, VC-12 is a basic virtual container, TU-12 is a tributary unit, TUG-21 and TUG-32 are tributary unit groups, VC-4 is a higher order virtual container, AU-4 is an administrative unit, and STM-1 is a synchronous transfer module.

The tributary unit TU-12 is formed by adding to the basic virtual container VC-12, formed from a 2.048 Mb/s container C-12, a path overhead VC-12 POH for transmitting control information among transmission apparatuses. By adding to the tributary unit TU-12 a pointer TU-12 PTR and multiplexing these in triplicate, the tributary unit group TUG-21 is formed.

By multiplexing seven tributary unit groups TUG-21, the tributary unit group TUG-32 is formed. Further, by multiplexing the tributary unit groups TUG-32 in triplicate and adding the path overhead VC-4 POH, the higher order virtual container VC-4 is formed.

By adding to the higher order virtual container VC-4 the path overhead VC-4 POH, the administrative unit AU-4 is formed. By adding to the administrative unit AU-4 the pointer AU-4 PTR, the synchronous transfer module STM-1 is formed.

The above multiplex hierarchy is a basic item in the CCITT Recommendations.

Figure 2:
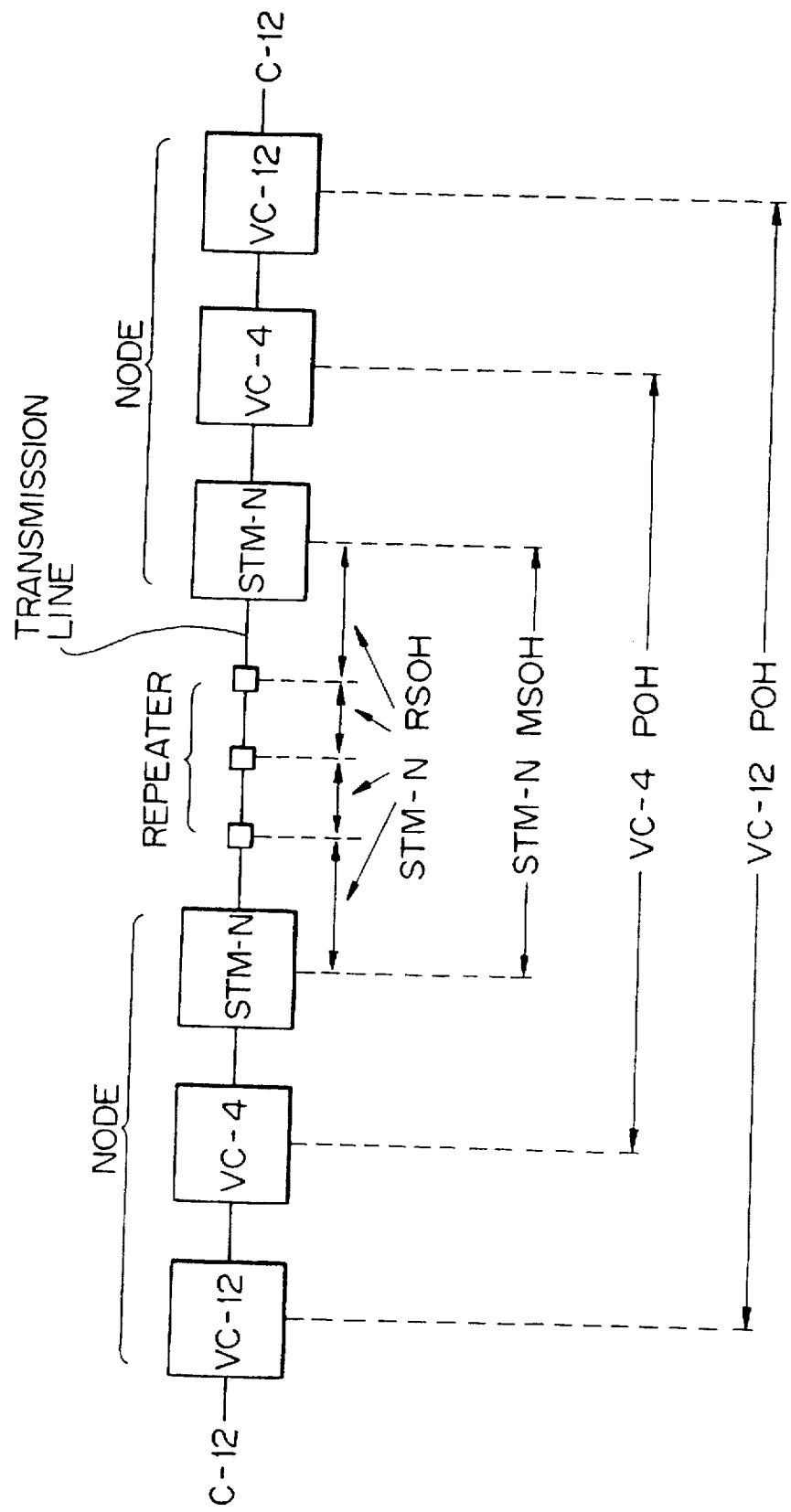
FIG. 2 is a view of the overhead boundary in a synchronous communication network.

FIG. 2 is a view of the overhead boundary in a synchronous communication network. In FIG. 2, a path overhead VC-12 POH for transmitting control information between transmission apparatuses is added between the basic virtual containers VC-12, a path overhead VC-4 POH for transmitting control information between transmission apparatuses is added between the higher order virtual containers VC-4, and a section overhead STM-N MSOH for transmitting control information between transmission apparatuses and a section overhead STM-N RSOH for transmitting control information between repeaters are added between the synchronous transfer modules STM-N.

The N in the above-mentioned "STM-N" stands for 1, 2, 3, etc. In FIG. 2, the example is shown where N=1. Further, MSOH means a multiplexer SOH, while RSOH means a regenerator SOH. Note that RSOH is, for example, an order-wire signal which can be monitored by the repeaters in the figure. MSOH cannot be monitored by these repeaters and can only be monitored by the STMs at the two ends. Incidentally, the signals C-12 are low order level signals used at the subscriber side.

Figure 3:
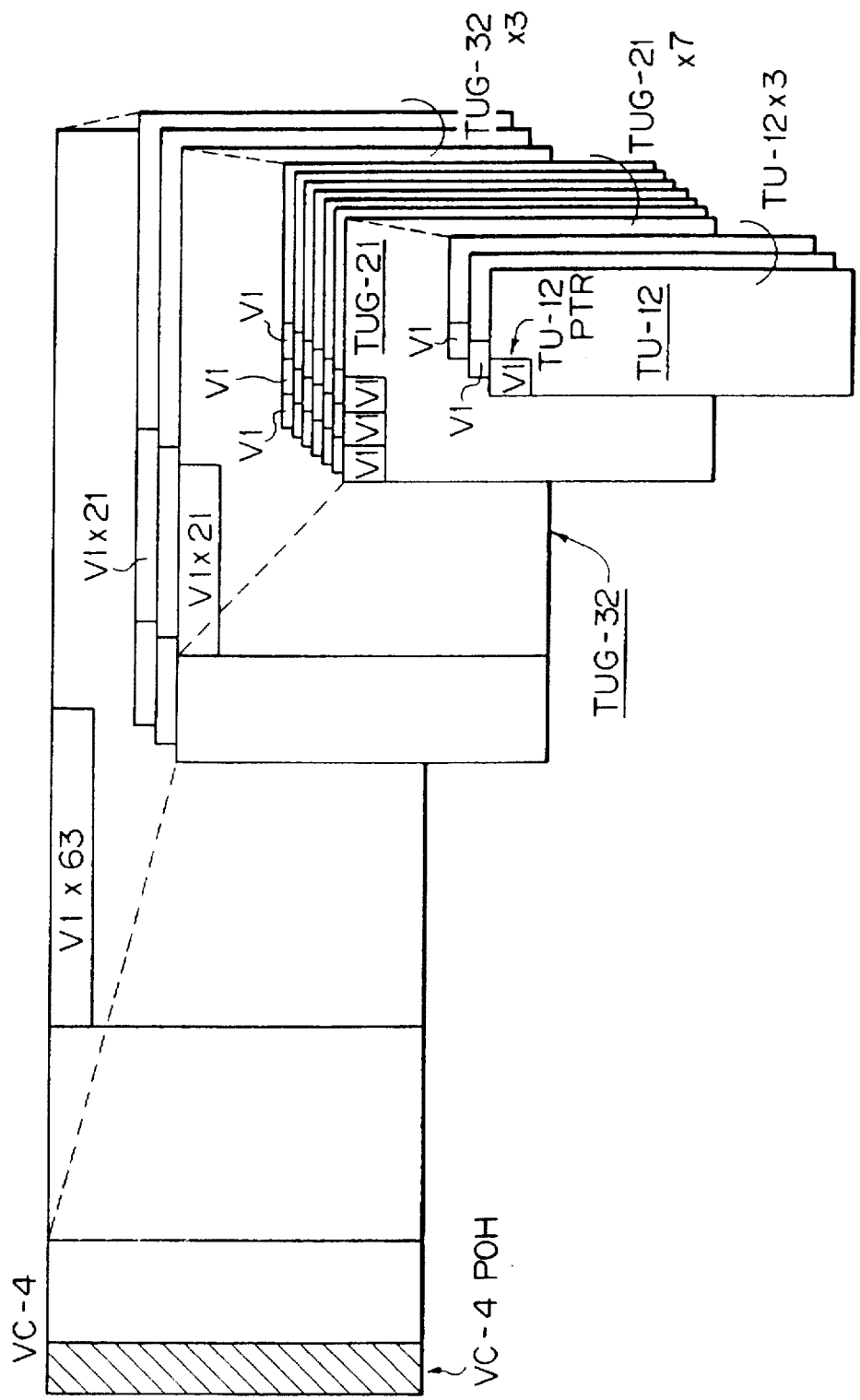
FIG. 3 is a view of mapping from VC-1 to VC-4.

FIG. 3 is a view of mapping from VC-1 to VC-4. In FIG. 3, the tributary unit group TUG 21 is formed by adding to a tributary unit 12, formed by adding to a basic virtual container VC-12 formed from a 2.048 Mb/s container C-12 a path overhead POH, V1 as the pointer TU-12 PTR and multiplexing these in triplicate.

By multiplexing seven tributary unit groups TUG-21, the tributary unit group TUG-32 is formed. Further, by multiplexing the tributary unit groups TUG-32 in triplicate and adding the path overhead VC-4 POH, the higher order virtual container VC-4 is formed.

Figure 4:
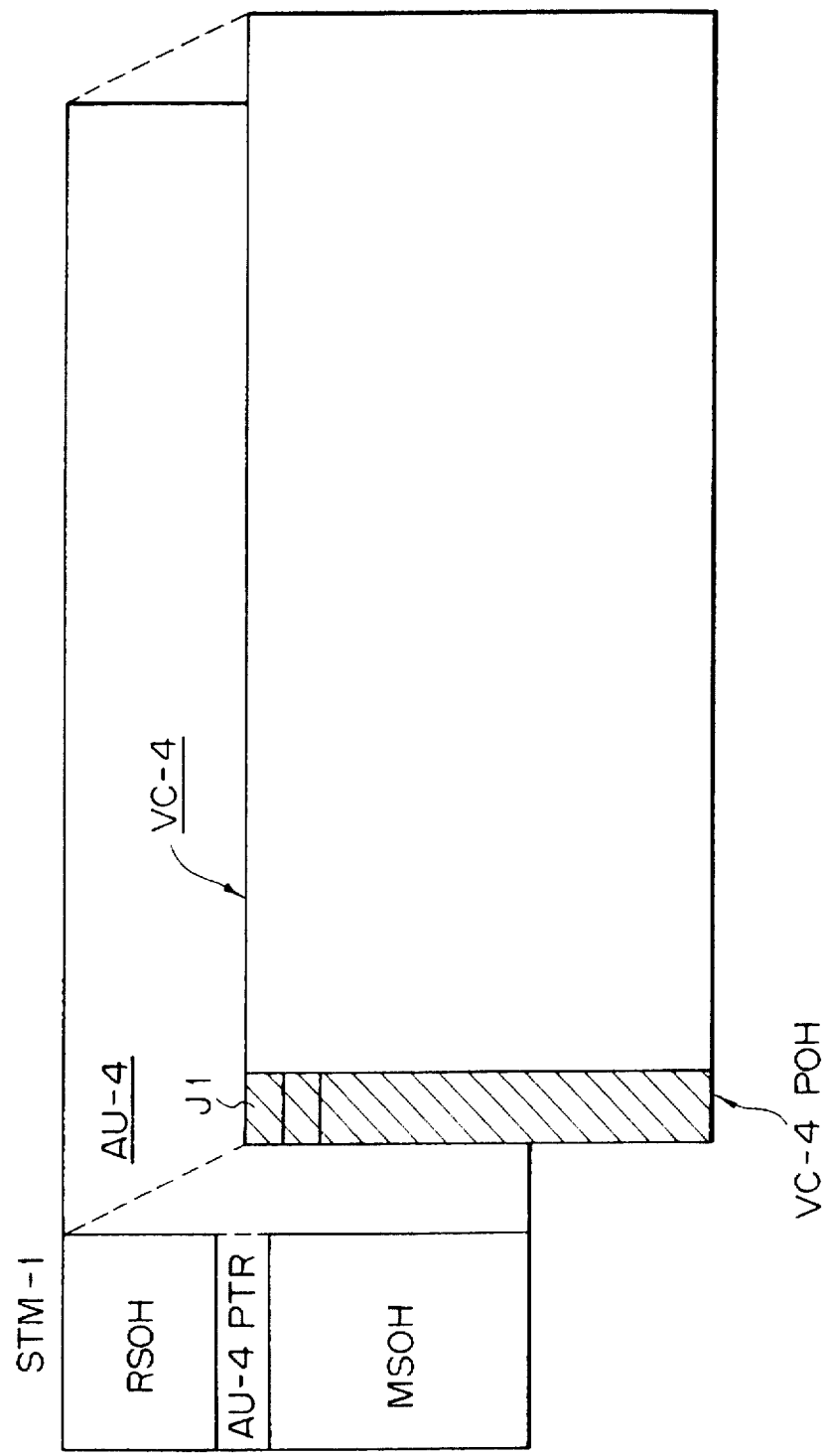
FIG. 4 is a view of mapping from VC-4 to STM-1.

FIG. 4 is a view of mapping from VC-4 to STM-1. In FIG. 4, an administrative unit AU-4 is formed by adding to the higher order virtual container VC-4 a pointer AU-4 PTR and a synchronous transfer module STM-1 is formed by adding to the administrative unit AU-4 the section overheads STM-1 RSOH and MSOH.

The above-mentioned AU-4 PTR is a value indicating the position of the so-called J1 byte in the figure. Using this, it is possible to specify the header position of data. When mapping data in the higher order virtual container VC-4, it is not set where the header position of the data will be. Therefore, a pointer is used to show the header position.

As explained above, synchronous multiplexing has been performed up to the higher order region due to the standardization of digital communication networks in recent years. As a result, asynchronization among transmission apparatuses sometimes causes trouble. Accordingly, it has become necessary to check for the establishment of synchronization by simple methods or apparatuses. Below, an explanation will be given of the present invention which enables the establishment of synchronization to be checked by a simple method.

Figure 5A:
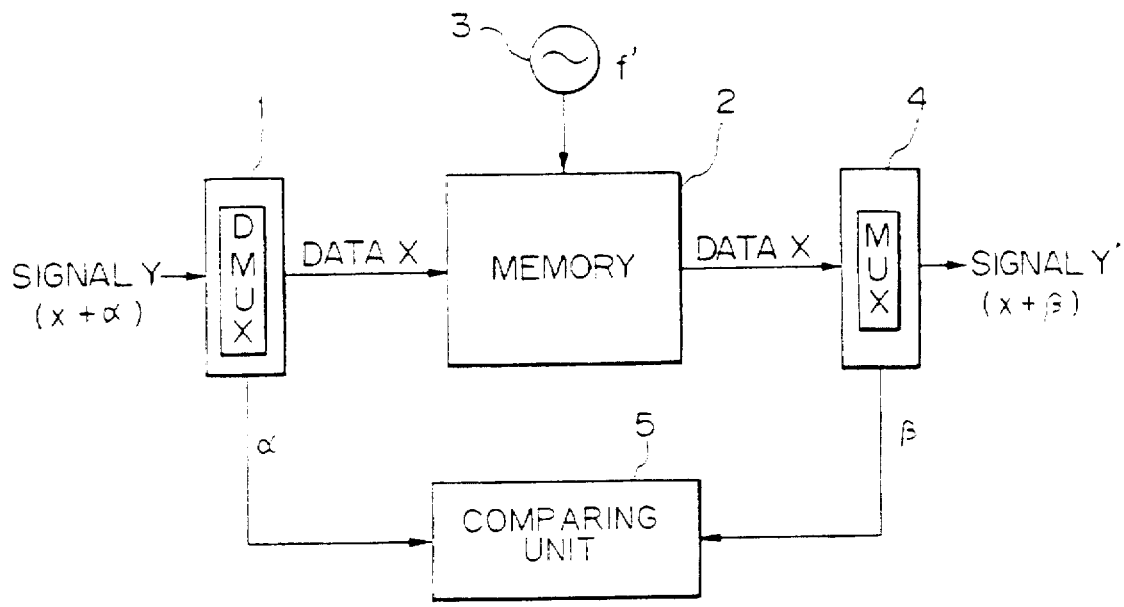
FIG. 5A is a view of the configuration of a node (transmission apparatus) in a synchronous communication network to which the principle of the present invention is applied.
Figure 5B:
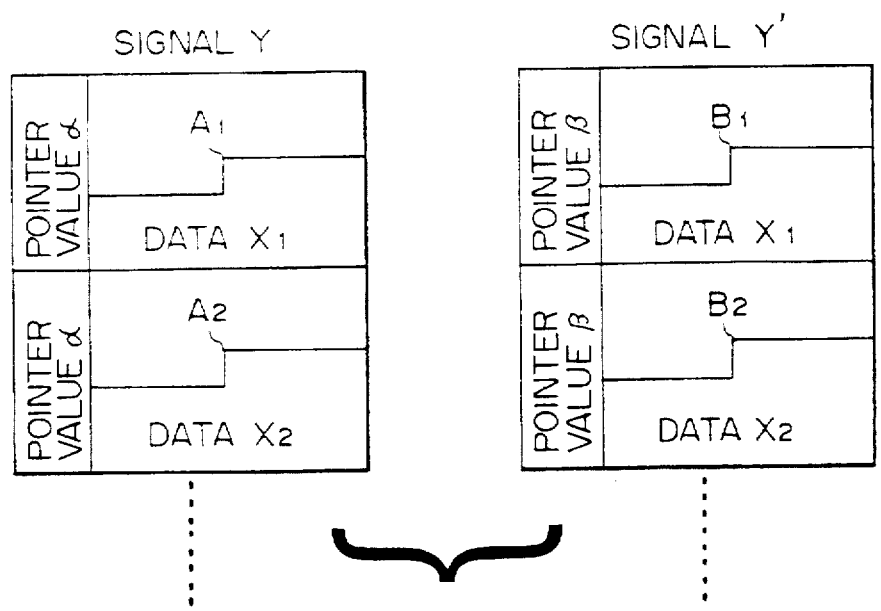
FIG. 5B is a view of the signal formats of a received signal Y and transmission signal Y' in FIG. 5A.

FIG. 5A is a view of the configuration of a node (transmission apparatus) in a synchronous communication network to which the principle of the present invention is applied. FIG. 5B is a view of the signal formats of a received signal Y and transmission signal Y' in FIG. 5A.

The method of the present invention checks the establishment of synchronization at a node of a synchronous communication network which communicates by sending and receiving frames formed by successively adding pointers ($\alpha$, $\beta$) to a plurality of data X to show their header positions. It compares the values $\alpha$ of the pointers added to the data X received from an opposing node (not shown in FIG. 5A, but at the left side of the figure) side and the values $\beta$ of the pointers to be added to the data X transmitted from the home node (node shown in the figure) and, when detecting that the two values ($\alpha$, $\beta$) match, recognizes that synchronization has been established between the opposing node and the home node.

More specifically, the method of the present invention a) demultiplexes the signal Y received from the opposing node into the data X and pointers ($\alpha$) by the timing of the received signal Y and holds the data X, b) successively reads out the held data X by the clock (f') of the clock source 3 in the home node, adds pointers ($\alpha$) showing the headers of the same to the data X, and multiplexes them to form the transmission signal Y', c) compares the pointers ($\alpha$) demultiplexed from the received signal Y and the pointers ($\beta$) added to the transmission signal Y', and d) detects that the clock of the transmission node of the received signal Y and the clock of the home node are synchronized when the two pointers are compared and found to match.

Reference numeral 1 is a demultiplexer unit (DMUX) which takes out the data X from the received signal Y and monitors the values $\alpha$ of the pointers added to the data X at that time. Reference numeral 2 is a memory which holds the data X demultiplexed at the demultiplexer unit 1. Reference numeral 3 is a clock source which supplies a master clock (f') of the node (transmission apparatus). Reference numeral 4 is a multiplexer unit (MUX) which multiplexes the data X which has been demultiplexed and forms the transmission signal Y' and also, at that time, confirms the headers of the data X, adds pointers ($\beta$) showing the positions of the same, and continuously monitors the values $\beta$ of the pointers at that time. Reference numeral 5 is a comparing unit which compares the values $\alpha$ of the pointers monitored at the demultiplexer unit 1 and the values $\beta$ of the pointers monitored at the multiplexer unit 4.

The data X demultiplexed from the received signal Y at the demultiplexer unit 1 are written into the memory 2 as they are in synchronization with the speed of the received signal. At this time, the demultiplexer unit 1 monitors the values $\alpha$ of the pointers added to the data X.

In the example shown in FIG. 1 to FIG. 4, since the 63 tributary units mapped in a fixed order in the synchronous transfer module STM-1 have been given V1 as pointer values $\alpha$, this is monitored for each tributary unit.

The data X written into the memory 2 are read out from the memory 2 in synchronization with the master clock (f') of the node (transmission apparatus) from the clock source 3 and are multiplexed into the signal Y' at the multiplexer unit 4. At this time, the multiplexer unit 4 confirms the position of the headers of the data X, adds pointer values $\beta$ showing those positions, and monitors the values.

In the example shown in FIG. 1 to FIG. 4, the multiplexer unit 4 successively reads out 63 tributary units from the memory 2 in the same order as at the demultiplexer unit 1 side and once again composes the synchronous transfer module STM-1. At this time, it adds V1 as the pointer values $\beta$ in the same order.

The comparing unit 5 compares the pointer values $\alpha$ being monitored in the demultiplexer unit 1 and the pointer values $\beta$ being monitored in the multiplexer unit 4 and, if $\alpha$ and $\beta$ match, it is judged that synchronization has been established between the node (transmission apparatus) and the apparatus of the opposing node transmitting the received signal Y. Further, when $\alpha$ and $\beta$ do not match, it is judged that there is a difference in the speed of the clocks from the clock sources used as master clocks by the transmission apparatuses and therefore synchronization is not established.

This processing is performed on the pointer values $\alpha$ and $\beta$ with respect to the header positions $A_1, A_2, \ldots$ of the data $X_1, X_2, \ldots$ in the received signal Y and the header positions $B_1, B_2, \ldots$ of the data $X_1, X_2, \ldots$ in the transmission signal Y' and the coincidence of the results of comparison of α and β is watched so as to check the establishment of synchronization (between the opposing node and home node). These $X_1, X_2, \ldots, A_1, A_2, \ldots, B_1, B_2, \ldots$ are as shown in FIG. 5B. Note that the pointer shown in FIG. 5B corresponds, for example, to the pointer AU-4 PTR in FIG. 4. The RSOH and MSOH adjoining this AU-4 PTR are omitted from the illustration in FIG. 5B.

In this case, the pointers are compared between the overheads of the received signal and transmission signal given path overheads or section overheads of the same level. For example, referring to FIG. 2, a comparison is made by the comparing unit 5 between the pointers belonging to the path overhead VC-12 POH level.

FIG. 6 is a view of an embodiment of the present invention. Reference numerals 10, 20, and 30 show nodes (offices) in a synchronous communication network. It shows only the important parts of the configuration at the nodes when transmitting data X from the node 10 through the node 20 to the node 30. Further, 40 shows a transmission line connecting the node 10 and the node 20, while 50 shows a transmission line connecting the node 20 and the node 30.

At the opposing node 10, reference numeral 11 is a clock source which supplies a master clock (f) at the node 10. Reference numeral 12 is a multiplexer unit (MUX) which multiplexes the data X to form a transmission signal Y. Reference numeral 13 is a pointer adding unit which adds the pointer values α to the data X.

At the home node 20 (corresponding to FIG. 5A), 21 is a demultiplexer unit (DMUX) which receives the signal Y from the node 20 and demultiplexes the data X and the pointers (α). Reference numeral 23 is a clock source which supplies the master clock (f') at the node 20. Reference numeral 22 is a memory which holds the data X demultiplexed at the demultiplexer unit 21. Reference numeral 24 is a multiplexer unit (MUX) which remaps the data X read out from the memory 2 in synchronization with the clock (f') and adds the pointer values β to the data X to form the transmission signal Y'. Reference numeral 25 is a comparing unit which compares the pointer values α and the pointer values β.

At the node (downstream side) 30, 31 is a demultiplexer unit (DMUX) which receives the signal Y' and demultiplexes it to the data X and the pointers (β). Reference numeral 32 is a pointer deleting unit which removes the demultiplexed pointers and outputs the data X.

At the opposing node 10, the data X are multiplexed to the signal Y (mapped into Y) in synchronization with the master clock (f). At this time, the pointer values α showing the headers of the data X in the signal Y are added. The signal Y sent from the node 10 is transmitted through the transmission line 40 and received at the home node 20.

At the home node 20, the data X is taken out from the signal Y and held in the memory 23 and the values α of the pointers which have been added are monitored. Further, the data X are multiplexed by remapping into the signal Y' in synchronization with the master clock (f') of the node 20. At this time, the values α of the pointers and the values β of the pointers are compared and if α does not equal β, it is judged that the clock f does not equal f'. By this, it is confirmed that the clocks of the node 10 and the node 20 are not synchronized. The signal Y' sent from the node 20 is sent through the transmission line 50 and received at the downstream node 30.

At the node 30, the data X are taken out from the signal Y', the added pointers (β) are demultiplexed and removed by the pointer deleting unit 32, and thus the data X are extracted.

Note that in FIG. 6, the nodes 10, 20, and 30 are similar to each other in configuration, but only the portions required for explaining the operations at the nodes are drawn. As mentioned above, the node 20 of FIG. 6 corresponds to the node shown in FIG. 5A, and the members 1, 2, 3, 4, and 5 in FIG. 5A correspond to the members 21, 22, 23, 24, and 25 in FIG. 6.

In this way, according to the present invention, by detecting the coincidence of the pointers of the received signal and the transmission signal, it is possible to confirm the state of synchronization between nodes (transmission apparatuses). This information confirming synchronization can be used as alarm information for synchronization between transmission apparatuses. For example, it may be used for transmitting a message showing that they are out of synchronization.

Figure 7:
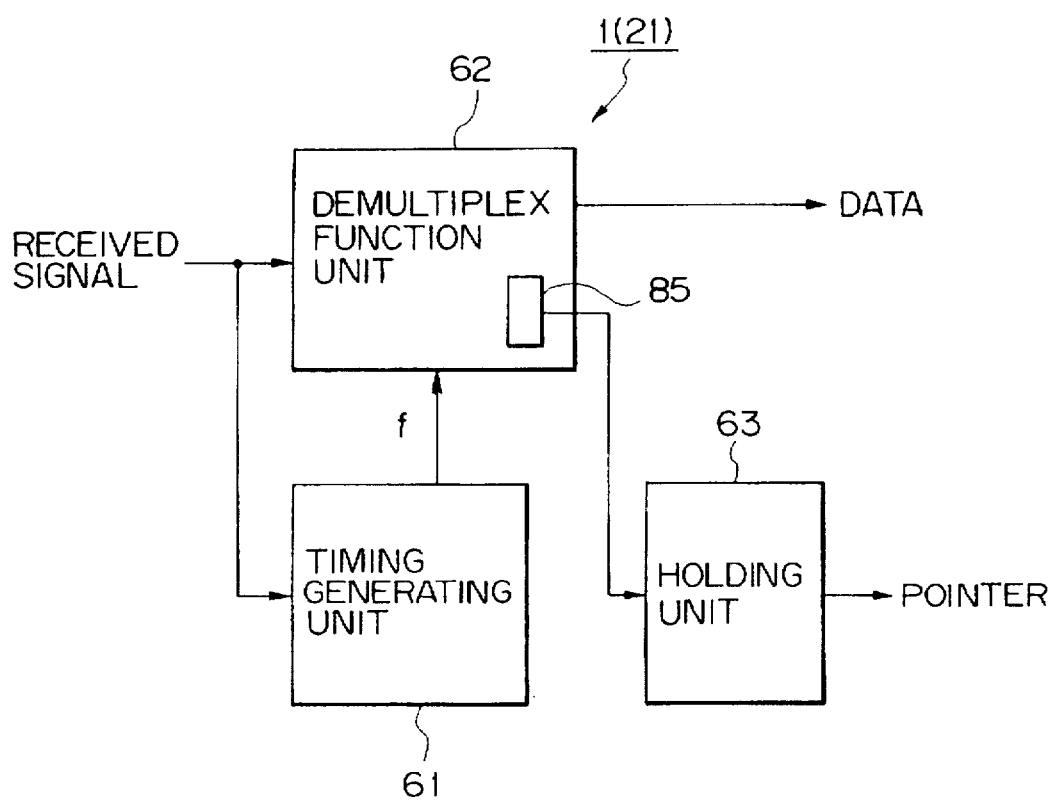
FIG. 7 is a view of an example of the configuration of a demultiplexer unit in the present invention.

FIG. 7 is a view of an example of the configuration of a demultiplexer unit in the present invention. Reference numeral 61 is a timing generating unit which generates a timing signal from the received signal, 62 is a demultiplex function unit which performs a demultiplex function for demultiplexing the received signal into the data and pointers, and 63 is a holding unit for holding the demultiplexed pointers.

At the timing generating unit 61, the timing component is extracted from the received signal to generate the timing signal. At the demultiplex function unit 62, the timing signal produced by the timing generating unit 61 is used to demultiplex the received signal into the data portion and the pointers showing the headers of the data. The data are then output and the demultiplexed pointers held temporarily in the holding unit 63.

Figure 8:
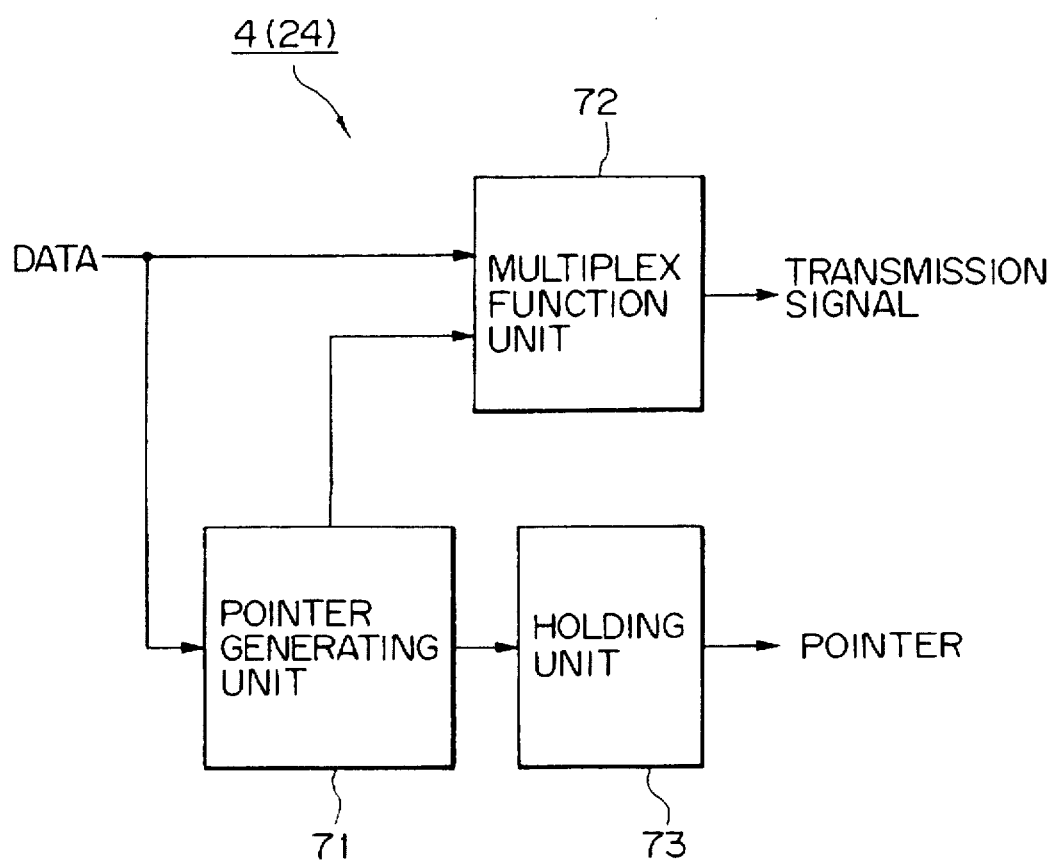
FIG. 8 is a view of an example of the configuration of a multiplexer unit in the present invention.

FIG. 8 is a view of an example of the configuration of a multiplexer unit in the present invention. In the figure, reference numeral 71 is a pointer generating unit for generating pointers to be added to data read out from the memory, 72 is a multiplex function unit which functions to multiplex the data and the pointers and produce a transmission signal, and 73 is a holding unit for holding the pointers produced in the pointer generating unit.

The pointer generating unit 71 produces pointers corresponding to the data successively read out from the memory. At the multiplex function unit 72, the corresponding pointers are added to the data successively read out from the memory so as to form frames and produce transmission signals and the added pointers are temporarily held in the holding unit 73.

Figure 9:
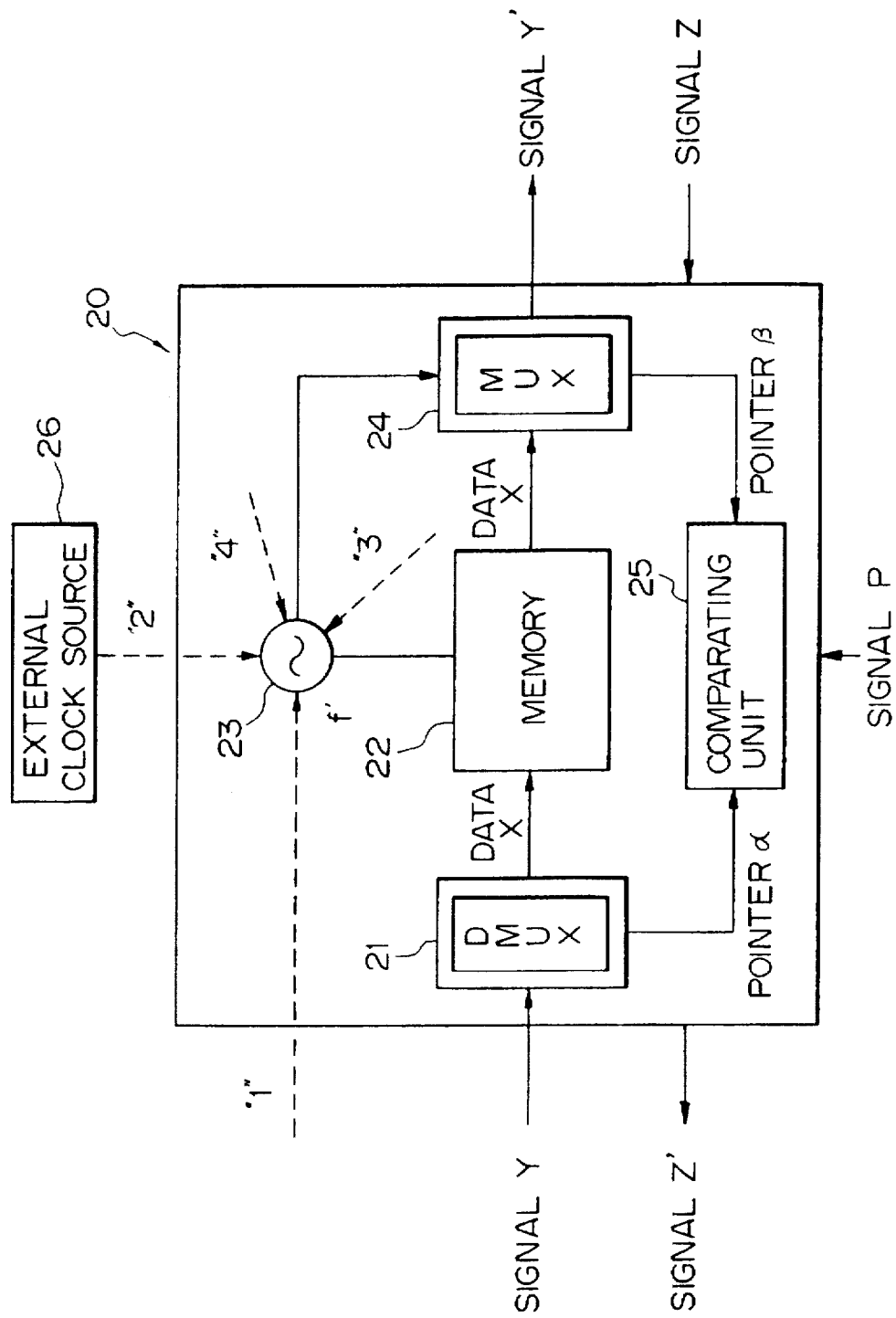
FIG. 9 is a view of an example of the application of the present invention.

FIG. 9 is a view of an example of the application of the present invention. This figure illustrates the structure of the home node 20 shown in FIG. 6. Reference numeral 26 is an external clock source provided at the node 20, the signals Z and Z' are downstream signals when the signals Y and Y' at the node 20 are made the upstream signals, for example, and P is a signal from a subnode (tributary) merging at the node 20. Further, "1" is the timing signal extracted from the received signal Y, "2" is the master clock from the external clock source 26, "3" is the timing signal extracted from the signal P from the subnode, and "4" is the timing signal extracted from the downstream signal Z.

Assuming now that the timing signal "1" from the received signal Y is used as the master clock source (f'), since the pointers α are always equal to β, there is synchronization with the opposing node sending out the signal Y.

However, when the timing signal "4" is used as the master clock source (f'), when synchronization is not established in the communication network as a whole due to some reason or another, a frequency difference is created between the clock of the signal Y clock source and the master clock (f') at the node 20.

Therefore, a plurality of clock sources are provided at the home node. These plurality of clock sources are periodically successively selected and used. The one clock source giving the result with the least noncoincidence in the comparison is finally selected and used as the representative clock source for the home node.

That is, the pointer values in the case of use of the values of the plurality of clock sources able to be periodically selected by the transmission apparatuses are compared and the single clock source giving the smallest frequency difference is selected as the master clock (f') of the apparatus. In this way, by making use of the pointer values to check the quality of the clock source, it is possible to continuously establish a synchronous network.

Note that in this case, if use is made of the timing signal "1" at all times, it might be thought that no problem would arise, but when there is some problem such as an abnormality in the apparatus at the opposing node side of the signal Y, it is not possible to use the timing signal "1". By setting up the system as in the present example of application, it is possible to select the more accurate clock source at all times.

Finally, more specific examples of the configuration of several of the constituent elements shown in FIG. 6, FIG. 7, and FIG. 8 will be shown.

Figure 10:
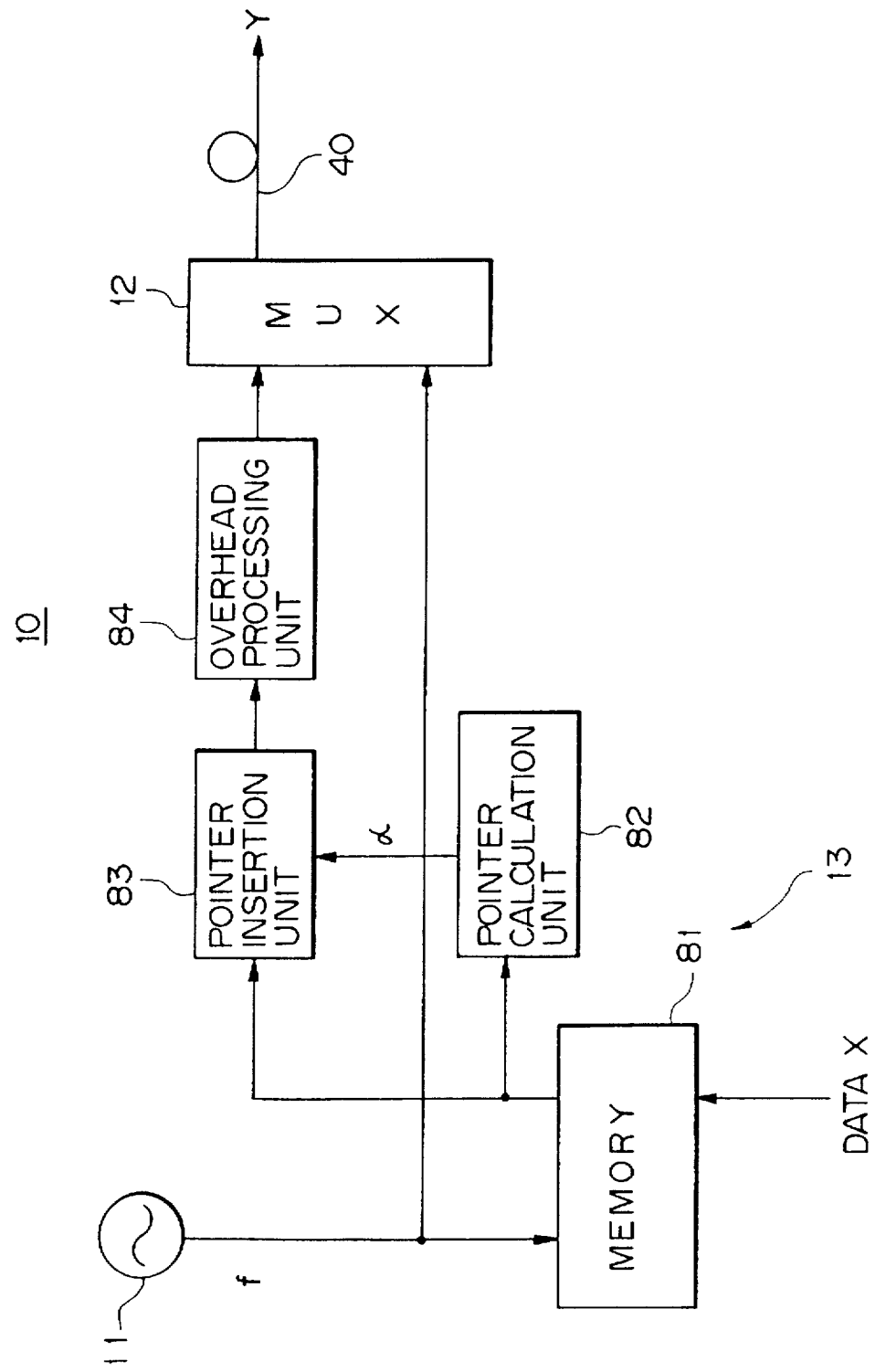
FIG. 10 is a view of a more specific example of the configuration of the node 10 in FIG. 6.

FIG. 10 is a view of a more specific example of the configuration of the node 10 in FIG. 6. In particular, it shows more specifically the pointer adding unit 13 of FIG. 6. As illustrated, the pointer adding unit 13 is comprised of a memory 81 for holding temporarily the data X, a pointer calculation unit 82 for calculating (counting) where the headers of the data X are so as to calculate the pointer values $\beta$, and a pointer insertion unit 83 for writing the values $\beta$ in pointer regions. After this, it is connected through an overhead processing unit 84 to a multiplexer unit 12.

The format of the signal Y is formed in synchronization with the master clock (f) and is sent to the node 20, but in this case a fixed value is always used as the values α of the pointers to be inserted. The reason is that the data X from the memory 81 is also synchronized with the clock (f).

Figure 11:
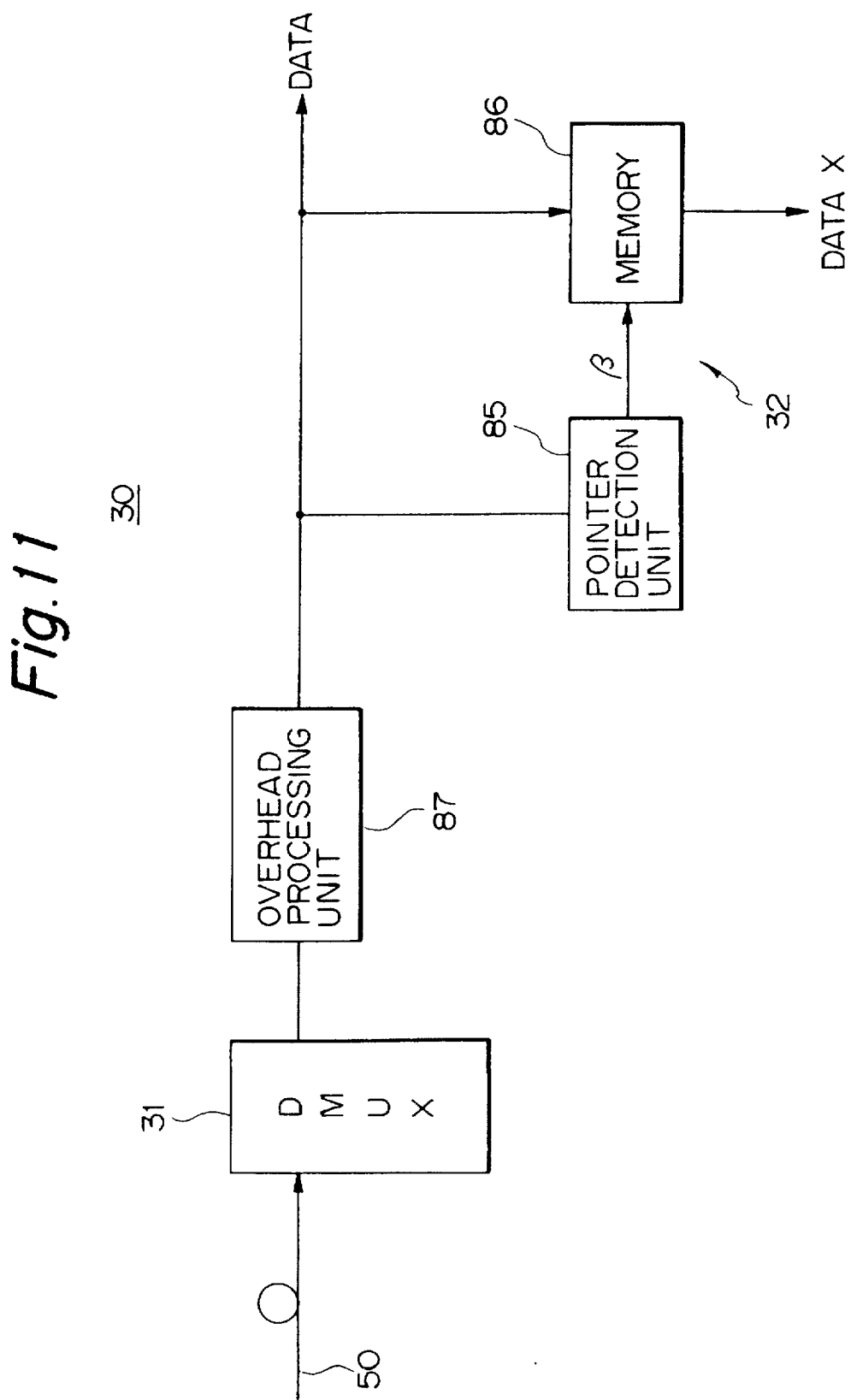
FIG. 11 is a view of a more specific example of the configuration of the node 30 in FIG. 6.

FIG. 11 is a view of a more specific example of the configuration of the node 30 in FIG. 6. In particular, it shows more specifically the pointer deleting unit 32 in FIG. 6.

The signal output from the demultiplexer unit 31 passes through the overhead processing unit 87, then the pointer detection unit 85 detects its pointer portions. Further, the values $\beta$ written into the pointers are read out.

On the other hand, the above-mentioned signal is stored temporarily in the memory 86 as well. Only the data X to be dropped at the node 30 are read out from the memory 86 by accessing by the pointer values $\beta$. The portions accessed by $\beta$ are the header positions of the data X.

Figure 12:
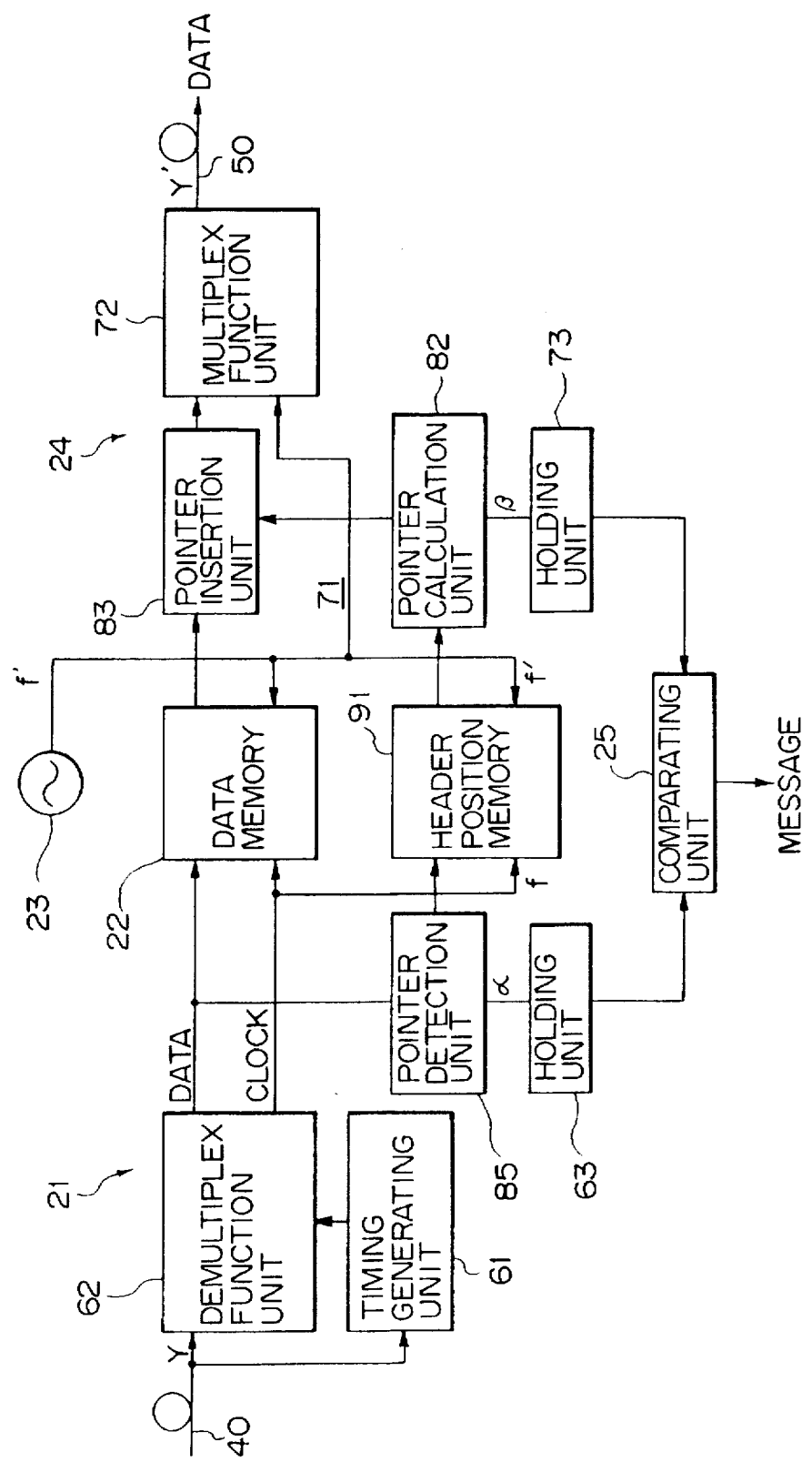
FIG. 12 is a view of a more specific example of the node 20 in FIG. 6.

FIG. 12 is a view of a more specific example of the node 20 in FIG. 6. Note that constituent elements substantially the same as those already explained are given the same reference numerals.

The demultiplexer unit 21 of FIG. 6 is comprised of a demultiplex function unit 62 (FIG. 7), a timing generating unit 61 (FIG. 7), a pointer detection unit 85 (FIG. 11), and a holding unit 63 (FIG. 7). Note that in this figure, the detection unit 85 is drawn pulled out from the function unit 62.

The multiplexer unit 24 of FIG. 6 is comprised of a pointer calculation unit 82 (FIG. 10) and pointer insertion unit 83 (FIG. 10) forming the pointer generating unit 71 shown in FIG. 8, a multiplex function unit 72 (FIG. 8), and a holding unit 73 (FIG. 8).

In a specific example of the present invention, provision is made of a header position memory 91 between the pointer detection unit 85 and pointer calculation unit 82. Each time the pointer detection unit 85 detects a pointer, the detection is written, in a form of pulse, into the memory 91 in a time series. The timing at this time is the clock (f).

On the other hand, the detection pulse stored in the memory 91 is read out in time series in synchronization with the clock (f'). In synchronization with this readout operation, the header positions of the data read out from the memory 22 are calculated (counted) to find the values $\beta$ of the pointers.

FIG. 13 is a view of an example of a demultiplex function unit shown in FIG. 7 and FIG. 12. Constituent elements substantially the same as those already explained are given the same reference numerals. In the demultiplex function unit 62, the data reproducing unit 92 and the frame synchronization unit 93 for detecting the frame byte (header) of the received data are constituent elements shown for the first time in this figure. Note that the pointer detection unit 85 operates to detect pointer areas (PTR) located at the portions separated by a certain predetermined number of bytes from the frame byte (header) detected by the unit 93.

As explained above, the present invention enables continuous confirmation of the synchronization among transmission apparatuses in a synchronous communication network and therefore contributes greatly to the improvement of the reliability of communication networks overall.

We claim:

1. A method for checking the establishment of synchronization at a node in a synchronous communication network which performs communication by sending and receiving multiplexed frames, comprising the steps of:

forming said frames by successively adding pointers showing header positions to a plurality of data portions;

comparing at said node between the value of a pointer included in each data portion received from an opposing node side and the value of a pointer to be added to each data portion, which is the same as the received data portion, and to be sent from a home node;

detecting whether the compared values coincide, synchronization being established between the opposing node and the home node when said compared values coincide;

demultiplexing each of said frames received at said home node in a received signal from the opposing node into said data portions and said pointers in correspondence with a timing component in the received frames;

holding the data in a memory device, successively reading out the held data portions in correspondence with a clock of a clock source in the home node, adding pointers to the read out data portions at the home node showing headers of the data portions to be sent and multiplexing to form frames of a transmission signal from said home node, comparing the pointers demultiplexed from the received frames and the pointers added to the transmission signal, and detecting that a clock of the opposing node that provided the received signal and the clock of the home node are synchronized when the compared pointers are found to coincide.

wherein a plurality of clock sources are provided at the home node and a further step of periodically successively selecting and using the plurality of clock sources, one of said plurality of clock sources giving a result with least non-coincidence in the comparison being finally selected and used as a representative clock source for the home node.

2. An apparatus for checking for the establishment of synchronization at a node in a synchronous communication network which performs communication by sending signals and receiving signals of multiplexed frames formed by successively adding pointers showing header positions to a plurality of data portions, comprising:

a demultiplexer unit (1) at a home node for demultiplexing a received signal sent from a transmission node into data portions and pointers in correspondence with a timing of the received signal, a memory (2) for holding the demultiplexed data portions, a multiplexer unit (4) for successively reading out the held data from said memory in time with a clock of a clock source (3) of the home node, for adding pointers showing headers of the read out data and for multiplexing said read-out data and added pointers to prepare a transmission signal to be sent from said home node, and a comparing unit (5) for comparing the pointers separated from said received signal by the demultiplexer unit (1) and the pointers added to said transmission signal by the multiplexer unit (4), so as to find whether or not the synchronization between a clock of the transmission node of the received signal and the clock of the home node is established by the resultant comparison and, if it is not established, said clock of said home node is adjusted without adjusting the pointers.

3. An apparatus for checking for the establishment of synchronization at a node in a synchronous communication network which performs communication by sending signals and receiving signals of multiplexed frames formed by successively adding pointers showing header positions to a plurality of data portions, comprising:

a demultiplexer unit (1) at a home node for demultiplexing a received signal sent from a transmission node into data portions and pointers in correspondence with a timing component in the received signal, a memory (2) for holding the demultiplexed data portions, a multiplexer unit (4) for successively reading out the held data from said memory in time with a clock of a clock source (3) of the home node, for adding pointers showing headers of the read out data and for multiplexing said read-out data and added pointers to prepare a transmission signal to be sent from said home node, and a comparing unit (5) for comparing the pointers separated from said received signal by the demultiplexer unit (1) and the pointers added to said transmission signal by the multiplexer unit (4), synchronization between a clock of the transmission node of the received signal and the clock of the home node being detected by coincidence in the comparison, wherein said demultiplexer unit (1) includes a demultiplex function unit for said demultiplexing of the received signal into said data portions and pointers, and a first holding unit (63) for holding the demultiplexed pointers, said multiplexer unit (4) includes a multiplex function unit (72) for successively reading out the data portions held in the memory (2), timed by the clock of the home node, and for successively adding said pointers to said read-out data portions indicating the respective headers of the read-out data portions and multiplexing said read-out data portions and pointers to prepare said transmission signal, and includes a second holding unit for holding the added pointers, and said comparing unit (5) detecting the coincidence of the pointers held in the first holding unit (63) and the pointers held in the second holding unit (73) coincidence of said pointers corresponding to synchronization between the clock of the transmission node of the received signal and the clock of the home node.

4. An apparatus for checking for the establishment of synchronization as set forth in claim 3, wherein said multiplexer unit (4) includes a pointer generating unit (71) for adding pointers to said read-out data portions.

5. An apparatus for checking for the establishment of synchronization as set forth in claim 4, further comprising:

a pointer detection unit (85) provided in said demultiplexer unit for detecting said received pointers in said received signal, a pointer calculation unit (82) provided in said pointer generating unit (71) for adding said added pointers to said data portions read-out from memory, and a header position memory, connected between said pointer detection unit and said pointer calculation unit for writing detection pulses by a first clock each time the pointer detection unit detects a pointer, reading out detection pulses by a second clock, and causing the calculation of the header position of the received data at the pointer calculation unit.

6. An apparatus for checking for the establishment of synchronization as set forth in claim 3, wherein said demultiplexer unit (1) includes a timing generating unit (61) for extracting the timing component of said received signal.

* * * * *